June 26, 1962 A. B. CISTOLA 3,041,491
DISPLAY DEVICE
Filed May 25, 1959 4 Sheets-Sheet 1

INVENTOR
Anthony B. Cistola

BY Sughrue, Rothwell, Mion and Zinn
ATTORNEYS

June 26, 1962      A. B. CISTOLA      3,041,491

DISPLAY DEVICE

Filed May 25, 1959      4 Sheets-Sheet 2

June 26, 1962 A. B. CISTOLA 3,041,491
DISPLAY DEVICE

Filed May 25, 1959 4 Sheets-Sheet 3

June 26, 1962   A. B. CISTOLA   3,041,491
DISPLAY DEVICE

Filed May 25, 1959   4 Sheets-Sheet 4

United States Patent Office 3,041,491
Patented June 26, 1962

3,041,491
DISPLAY DEVICE
Anthony B. Cistola, Apalachin, N.Y., assignor to International Business Machines Corporation, New York, N.Y., a corporation of New York
Filed May 25, 1959, Ser. No. 815,612
14 Claims. (Cl. 313—108)

This invention relates to improvements in display devices and more particularly to a display device adapted to provide a visual readout of a desired character upon selective energization.

In the electronic data processing and telemetering arts, it is becoming increasingly important to provide visual readout display devices with instantaneous access time which are simple, compact, and which can display any desired character in the same display area.

Display devices of the visual readout type wherein selected characters may be displayed in the same display area are known in the prior art, and these devices vary from edge-lighted stacked character bearing Lucite plates to conventional monogram designs of selectively lighted Lucite rods, electroluminescent coated characters, and glow tube displays. The deficiencies of the prior art devices are complexity of construction and assembly, relatively short life, and lack of reliability or ruggedness. This invention provides a display device construction which overcomes the deficiencies of the prior known display devices.

This invention provides a display device for displaying selected characters in a common display area utilizing a novel configuration and arrangement of composite character-forming members, the members being in the form of thin, parallel plates, bars or the like. Sets of the parallel character-forming members form the desired characters to be displayed, and the characters are displayed in a common display area by selectively energizing any set. The sets for the different characters are interspaced in a composite array of character-forming members, and a display area is positioned in front of the array of sets of character-forming members. By energizing any set of parallel character-forming members and a transparent electrical member in front of the array, the character defined by the energized set energizes an illuminating medium between the transparent electrical member and the character-forming members to define an illuminated character image which may be displayed with high definition at the display area. The composite characters which are formed in the display area are produced from staggered and parallel sets of thin character-forming members and not from conventional monogram designs, thus providing a construction which is simple, rugged, compact, and reliable.

Utilizing the principles of this invention, it is possible to construct a display device in the form of a glow discharge tube in which the display surface includes a transparent anode screen, and selected sets of character-forming members form the cathode to create selective ionization of gas therebetween in the tube and thereby display the illuminated defined character at the display area. Also, the principles of this invention can be utilized in a vacuum tube type display in which the parallel character-forming sets in the tube envelope are coated with a phosphor, and the display area contains a substantially transparent, heated cathode, such that upon electron bombardment of the phosphors, a glowing character is produced which is visible through the display area of the envelope. Alternately, the display device can be in the nature of a solid-state display, in which the sets of staggered character-forming members are positioned behind electroluminescent material which has a mesh screen positioned therein. By suitable energization of sets of the plates and the mesh screen, the electroluminescent material glows in the shape of the selected character set.

The sets of character-forming members are preferably in the form of thin, parallel plates having different edge configurations in which the edge portion of the plates of a set defines the character to be displayed. The plates may be suitably insulated from each other, and only the front edge configuration of each plate is not insulated. As an alternate construction, if only a few characters are desired to be displayed in the display area, it is possible to construct the character-forming sets in the form of a partly insulated grid integral with a support plate; thus, by energizing the support plate, the conductive pattern of the grid will be energized for character display. Other plates having character sets defined by uninsulated grid portions are positioned behind the front plate with their grids in the space between the bars of the grid of the front plate to also display selected characters in the display area.

The display characters may be in the nature of numerical digits, as well as letters of the English alphabet or other alphabets, or special characters and symbols.

Thus, it is the object of this invention to form a visual readout unit or display device wherein selected characters may be displayed in a single area, and the characters are formed compositely from sets of thin, parallel line character-forming members, by energization of a selected character set and a transparent electrical member in front of the selected set of character-forming members and sandwiching an illumination medium, to thereby cause the medium to illuminate in the shape of the character defined by the selected set.

It is also an object of this invention to provide a display device of the nature set out above which may be constructed as a glow discharge tube, a high vacuum tube, or a solid-state device. If the device is in the nature of a glow discharge tube, it is a further object of the invention to provide a low-voltage switching system therefor.

It is an additional object of this invention to provide a display device which is characterized by its simplicity, compactness, ruggedness, long life, and lack of moving parts in a single plane visual readout.

Other objects and advantages of the invention will be pointed out in the following description and claims, and illustrated in the accompanying drawings, which disclose, by way of example, the principles of the invention and the best mode which has been contemplated of applying these principles.

Figure 1:
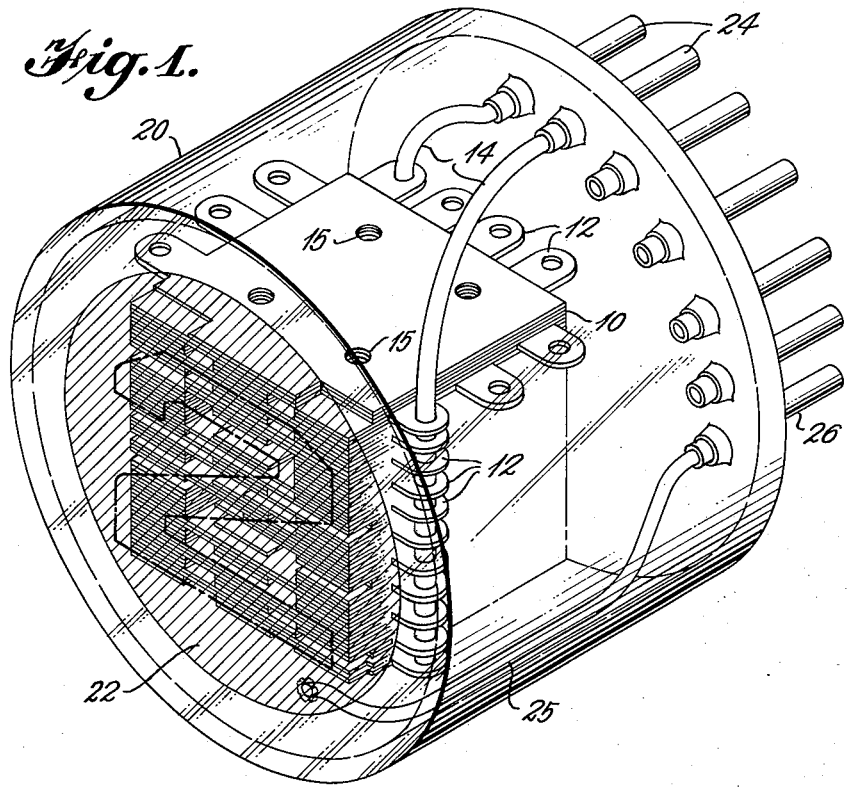
FIG. 1 is a perspective view of the display device of this invention in the form of a glow discharge device.
Figure 2:
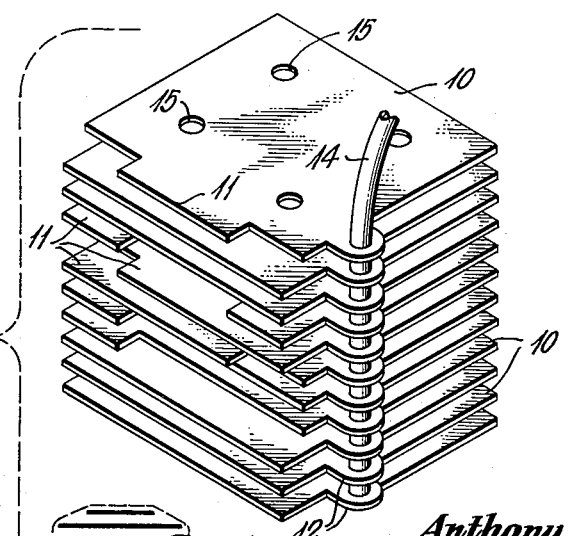
FIG. 2 is an illustration of one selected set of plates in the device, the set of plates adapted to represent the numeral 2.
Figure 3:
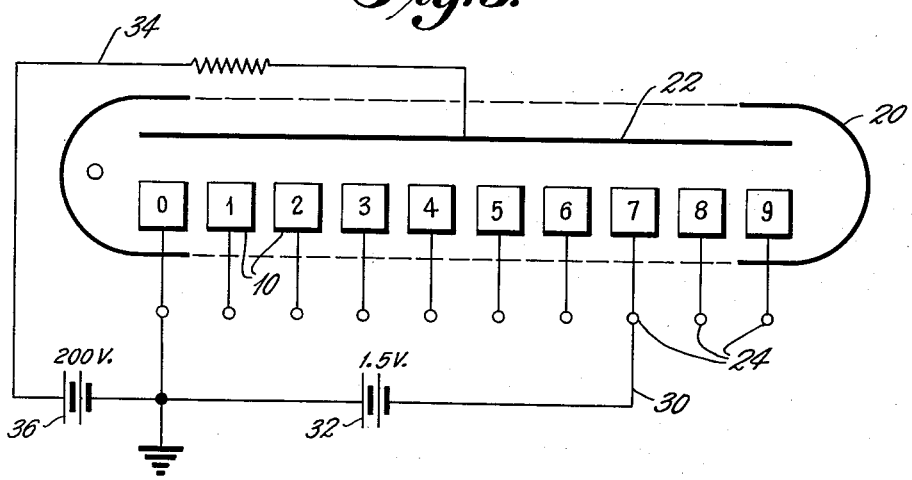
FIG. 3 is a circuit diagram of a low-voltage switching circuit utilized with a glow discharge type of display device.

Referring to the drawings, the display device constructed as a glow discharge tube from thin sets of parallel plates is illustrated in FIGS. 1 through 3, although the principles of the thin, parallel character-forming members and the display area in circuit are common throughout the various modifications. The glow discharge display device consists of a plurality of sets of stacked plates 10. The plates of each set are stacked alternately and are electrically connected in common to be energized for displaying the character which is defined by each set. The character fragment forming members are in the form of thin plates 10 which are stacked one on another in series, and each plate is insulated from the adjacent plate by a very thin layer of insulation. The front edge configuration 11 of each plate 10 varies with the character set to which the plate belongs, and the front edge configuration of each character set of plates designs and determines the character defined by the set. For example, in FIG. 2, the plates of the character set defining the numeral 2 are shown as they would be seen if removed from the stack of plates. Within the spaces between each plate of this set are the plates of adjacent sets, which are likewise electrically connected in common. The front portions of the edges are uninsulated and, therefore, conductive.

Each plate 10 has a terminal lug portion 12 thereon to which connecting wires 14 may be welded or otherwise secured to electrically connect all of the plates in each set in common. As shown in FIG. 1, the terminal lugs 12 for the different character sets are positioned in alignment along different portions of the edges of the stacked plates. Other known techniques could be utilized to electrically connect together each plate in a set of character-forming plates. Every plate also has aligned reference holes 15 for securing the stack of plates by rivets or the like.

The character fragment forming plates 10 form the cathode for the glow discharge display device and are enclosed in an envelope 20 having a screen type anode 22 in a display area portion thereof. The screen anode 22 is substantially transparent to illumination. The envelope is evacuated and filled with an ionizable gas; e.g., neon at approximately 2.5 cm. Hg pressure. The connections 14 from each separate set of character-forming members are connected to terminal prongs 24 extending through the envelope. The screen anode 22 is also connected by conductor 25 to a terminal prong 26 extending through the envelope. By electrically connecting the prong 26 and a selected prong 24 for a desired character set to an ionizing D.C. potential, the gas which fills the spaces between the selected set of plates 10 and screen 22 will ionize and create a visible glow of the character image which will be visible at the display area of the envelope 20.

If the ionizing potential is switched from any one of the terminals 24 to another, a new image will appear instantaneously in front of another set of character-forming plates. All images will be in the same plane and in the same display area, and access time is practically instantaneous. Except for the screen 22, no obstructions appear in front of the character image, and screen 22 is transparent.

A low-voltage switching system for switching the display device illustrated in FIG. 1 is shown in FIG. 3. The envelope 20 is filled with an ionizing gas, as described above, and the terminal prongs 24 or their connections are adapted to be selectively energized by conductor 30, which is connected to the negative side of a 1½-volt D.C. potential, such as battery 32. The anode screen 22 is connected by conductor 34 to the positive side of a 200-volt D.C. potential indicated at 36. The negative side of the 200-volt potential is connected to the terminal 24 or the character set O, and establishes an ionizing potential in front of this character set, thus causing the "O" to glow. If the conductor 30 establishes the negative side of battery 32 to any of the other terminal prongs 24, it will make that particular cathode set, such as the numeral "7," −201.5 volts with respect to the anode, and since this higher than that required for sustaining a discharge voltage, the ionization will shift to the "7" cathode set. Removal of the 1½-volt negative potential shifts the discharge back to the "O" cathode. Hence, the "O" cathode acts as a pilot, and the character "O" is glowing except when another character is displayed. This low-voltage switching arrangement allows the operation of this tube directly from a transistor.

The materials best suited for use as the cathode plates in the glow discharge tube are aluminum, magnesium and molybdenum. In a neon environment, these materials will have a cathode drop in the range of 90-120 volts, and, by the use of aluminum or magnesium, advantage may be taken of an anodizing process for anodizing the plates to establish the insulation therebetween. The entire plate is anodized, and the front edge portion thereof is ground or polished until the anodized coating is removed. The plates 10 may be fabricated by a photo-etching process or by precision stamping, and a plurality of terminals may be initially positioned around sides of the plates, since the plate edge configuration will be the same for several plates of different sets. With this construction, the undesired terminals for any selected set may be eliminated prior to assembly.

The thickness of the character fragment-forming plates and the number of plates per character determine the character capacity and height. The following table gives an example of several different possible constructions in the terms of dimensions for various numbers of characters, the plate thickness of the character-forming plates, the plates per character set and the size of the characters produced.

| No. of Character | Plate Thickness With Insulation | Plates per Character | Character Height and Width |
| --- | --- | --- | --- |
| 5 | .005" | 22 | .550" x .500" |
| 10 | .005" | 11 | .550" x .500" |
| 20 | .003" | 11 | .660" x .500" |
| 36 | .002" | 15 | 1.180" x .750" |

The dimensions of character size may be varied to obtain optimum resolution. The thickness of the plates and the number of plates per character determine the character height and the character capacity of the display device.

Figure 4:
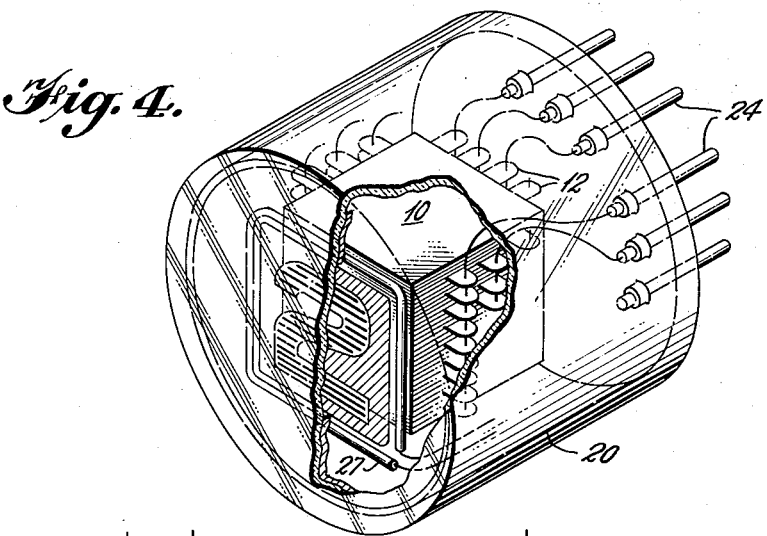
FIG. 4 is a perspective view of the display device of this invention in the modified form of a high vacuum tube type display.
Figure 5:
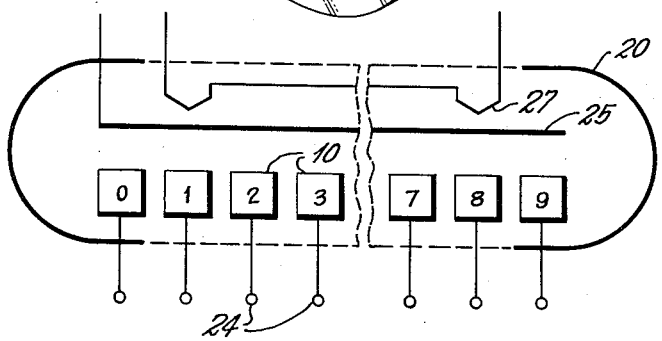
FIG. 5 is a schematic circuit diagram for the electrical connections in a vacuum-type display tube.

The display device can also be made in the form of a high vacuum tube display as shown in FIGS. 4 and 5. In this modification, the plates 10 are stacked in exactly the same fashion as that for the glow tube display device modification, and the stacked plate assembly is enclosed within an envelope having terminal prongs 24 extending therethrough. In the vacuum tube display modification, the stacked plates are made the anode, and the bare edges of the sets of plates are coated with a phosphorescent material. The display area of the tube contains a square-shaped cathode 25 which is heated by a filament heater 27 around the periphery thereof. Upon electron bombardment from the cathode 25, the anode character set connected in circuit will glow to display the character on the display area of the tube. FIG. 5 is a schematic illustration of the circuit for the high vacuum display device modification, and it may be seen that to display various characters, the positive potential of the anode is merely switched to another set of character-forming members.

A gain control may be inserted in the cathode circuit to provide a means for controlling the intensity of the displayed characters. Since the vacuum tube inherently provides rectification, it is possible to operate it with A.C. input signals.

Figure 6:
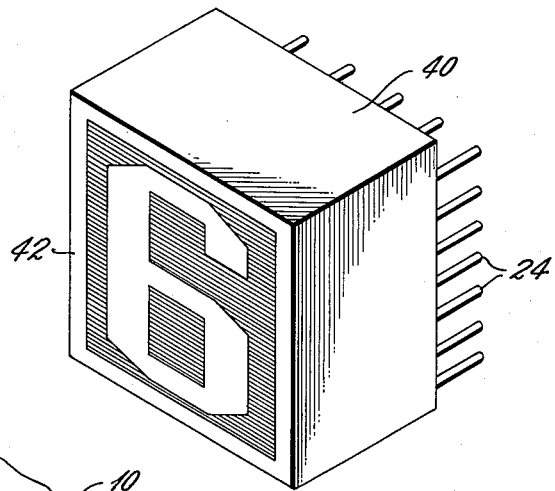
FIG. 6 is a perspective view of the display device of this invention in the form of a solid-state device.
Figure 7:
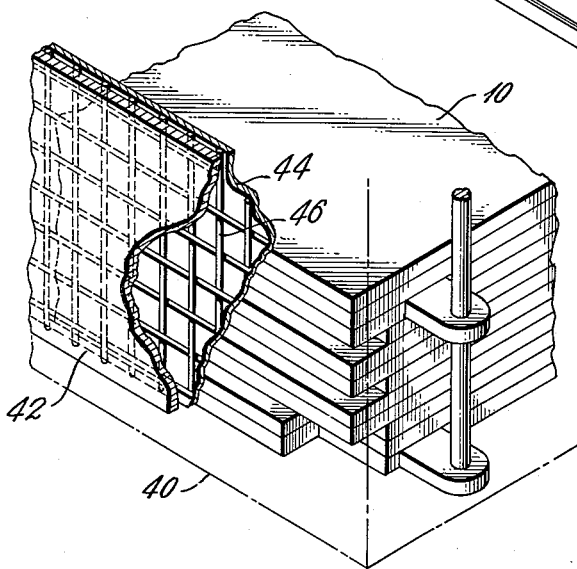
FIG. 7 is an enlarged detail view of a portion of the solid-state display device of FIG. 6.
Figure 8:
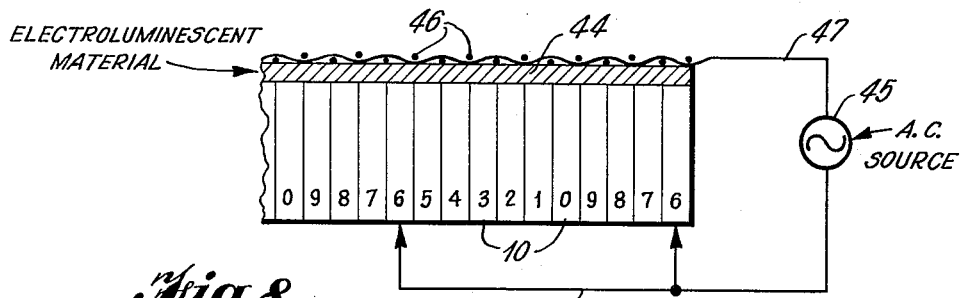
FIG. 8 is a portion of a circuit diagram for the solid-state display device of FIGS. 6 and 7.

The stacked plate assembly of this invention lends itself to a solid-state display device utilizing electroluminescence. The construction of this device is shown in perspective in FIG. 6, wherein the stacked plates 10 are enclosed in a plastic case 40 having a transparent display surface 42 and the usual terminal prongs 24, one for each character set of plates. The plates 10 are constructed and stacked in the manner described above, and the conductive front edge surface of each of the plates is coated with an electroluminescent material 44 over which a conductive mesh or screen 46 is provided, and the transparent display surface 42 is in front of the mesh, FIG. 7. The mesh screen 46 and the selected character set form the two electrodes for energizing the electroluminescent material 44. The circuit for operating the device of the solid-state modification is shown in FIG. 8. An A.C. potential 45 is applied through conductors 47 and 49 to the mesh and any selected one of the sets of plates 10 for the desired character, thus creating a soft glow between the mesh and the particular selected set of plates. Since the field was initially setup between the mesh and a particular group of plates, electroluminescence will take place in the electroluminescent material 44 in front of the selected set of plates only, thereby displaying the desired character. Switching from one group of plates to another instantaneously changes the displayed character.

Figure 9:
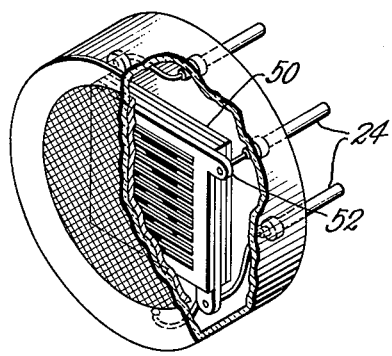
FIG. 9 is a perspective view of an alternative construction of a glow discharge display with character-forming sets defined by a partly insulated grid carried in a plate.
Figure 10:
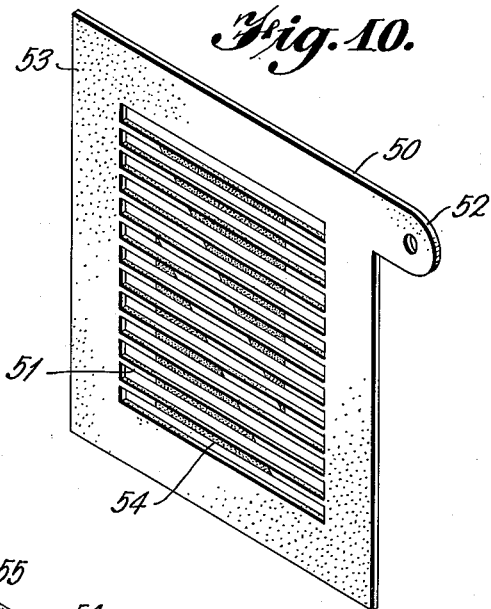
FIG. 10 is a perspective view of a single plate with a set of character-forming members defined by a partly insulated grid.
Figure 11:
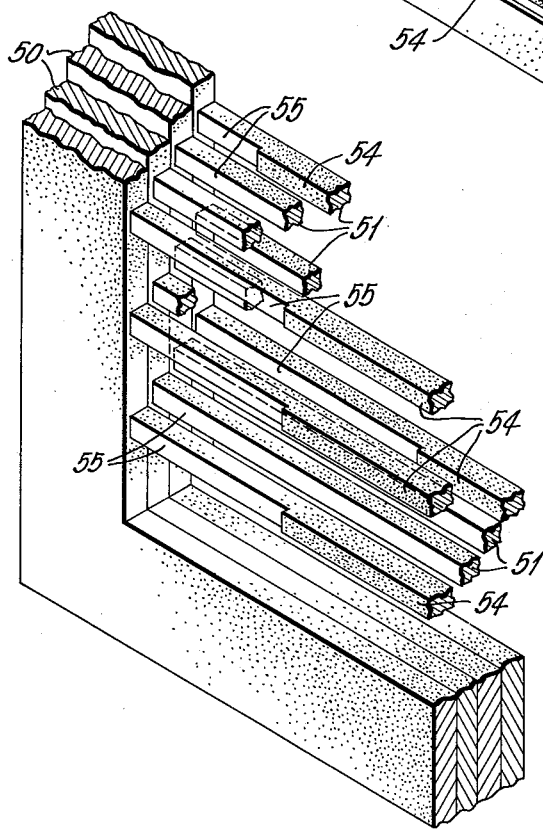
FIG. 11 is an enlarged detail view of a portion of the alternate construction of FIG. 9 showing the arrangement of a plurality of plates and grids.

Although in the preferred embodiment, a plurality of sets of character-forming members are in the form of sets of thin, stacked plates which have projecting terminal lugs and are connected in a common electrical circuit, with the sets being staggered in a common array or stack, an alternate method of fabrication is shown in FIGS. 9, 10 and 11. This alternate method of constructing the sets of thin, character-forming members provides a somewhat simpler type of construction, but has a limitation in that it can only be utilized where a display requires only a relatively small number of total possible characters, such as five or less. Cases where this might be desirable are where the characters might be symbols such as plus (+) or minus (—) or degrees (°) or English or Greek letters having a symbolic representation such as Δ, θ, φ, or N, S, E and W representing directions. A cutaway perspective view of this type of display device is shown in FIG. 9, wherein the device is utilized as a glow discharge display. The sets of character-forming members are made as grids in a single support plate 50 having a grid with parallel bars 51 shown in FIG. 10. The support plate 50 has a terminal 52 thereon for connection to terminal prongs 24, and each support plate 50 is insulated on the borders 53 and on portions 54 of the grid 51. Other portions 55 of the grid are left bare in the shape of the desired character. A plurality of sets of character-defining members in the form of support plates 50 with partially insulated grids 51 are shown in FIG. 11. For a four-character display, the space between the horizontal plate-like grids 51 of a set is approximately three times the width of the grid bar. Thus, three additional sets can be positioned behind the front set to provide for a total of four characters. This is illustrated in FIG. 11 wherein each of the four characters defined by sets of partially insulated grid bars 51 is carried in a support plate 50, and the support plates 50 are insulated from each other. The only uninsulated portions of the grid bars 51 are the portions of each character set defining the desired character. The device can then be energized in the manner of the glow discharge tube modification to accomplish single display area presentation of any selected character. This construction could also be utilized in a vacuum tube display device or a solid-state display device according to the teachings set out above.

While there have been shown and described and pointed out the fundamental novel features of the invention as applied to the preferred embodiment and modifications thereof, it will be understood that various other omissions, substitutions, and changes in the form and details of the device illustrated and in its operation may be made by those skilled in the art without departing from the spirit of the invention. It is the intention, therefore, to be limited only as indicated by the scope of the following claims.

What is claimed is:

1. A character display device comprising; a plurality of sets of plate-like character-forming members, each of said plate-like members presenting at an edge thereon a thin fragment of a character which is parallel in a viewing plane to each of the character fragments formed by each of said other members, said sets of said character-forming fragments, adapted to form separate composite characters, a transparent display surface positioned in front of the character fragment forming members and electrical means for selectively energizing any desired set of said character-forming fragments to thereby define and display the character defined by the selected set by creating a visible illumination from the thin fragments of the set at said display surface.

2. A character display device comprising; a plurality of sets of thin plate-like character fragment forming members, each of said members of each set being electrically insulated from the members of other sets and having a conductive edge configuration arranged in a single plane, the edge configuration of each set defining a character, the plate-like character fragment forming members from each set electrically connected in common, a display member positioned in front of said members including a transparent electrical circuit member, and means for selectively energizing any desired set of said character fragment forming sets and said transparent circuit member to display visible composite characters at said display member.

3. A composite character display device comprising; composite character defining and forming means arranged in thin, parallel lines all parallel to one another in a viewing plane, said means also arranged in separate sets, one of the lines in said character-forming means for each character set being adjacent to and staggered between the character-forming means for the set defining another character so that the space between adjacent lines of one set contains a line from the other sets, electrical means for simultaneously energizing all of said composite character defining and forming means of each set, and means responsive to the energization of any character set of said character fragment forming means to form a luminous display of the energized composite character set.

4. A display device as defined in claim 3 further comprising an envelope having a display surface and containing an ionizing gas surrounding said character fragment forming means, whereby energization of any selected character set ionizes said gas in the predetermined pattern of the selected character, which ionized gas is displayed on the display surface of the transparent envelope.

5. A character display device as defined in claim 3 wherein said sets of character fragment forming means are enclosed in a transparent envelope having a display surface, which envelope is evacuated so that it will contain a high vacuum therein, a phosphor material being coated on a character defining surface of said character fragment forming means, a heated cathode positioned in front of said character fragment forming means, whereby when said character sets are selectively energized, the phosphor material will be illuminated in the pattern representing the character to be displayed.

6. A composite character display device as defined in claim 3 wherein an electroluminescent material is positioned in front of said composite character fragment forming means, and the selected sets of character fragment forming means are adapted to be energized such that said electroluminescent material will glow in the pattern of the selected character set.

7. A composite character display device as defined in claim 3 wherein said composite character fragment forming means are in the form of thin plates which are stacked one on top of another to present the edges thereof in thin, parallel lines, said stacked plates being insulated from one another and the display edge thereof being conductive.

8. A character display device as defined in claim 3 wherein said composite character fragment forming means comprises a plurality of partially insulated spaced grids of grid containing plates, the sets of each character fragment forming means being carried on each grid plate and said plates being positioned one behind another with the grids of each grid containing plate staggered so that they will all be visible.

9. A character display device comprising a plurality of thin character-forming members positioned adjacent to one another and arranged so that all the character-forming members are parallel to one another, said members being arranged in staggered sets, each complete set defining a particular character, the space between adjacent members of one set containing at least one member of each of the other sets, electrical means for connecting each of said sets in common, a display surface for viewing a luminous display of any selected character set, said display surface positioned in front of said character-forming members and substantially transparent electrical circuit member between said display surface and the front of said character-forming members in the electrical circuit with the selected set.

10. A display device for visual readout of any selected character at the same display area, said display device comprising; a plurality of separate sets of character-forming members, means for electrically connecting each character-forming member of a single set and electrically insulating character-forming members of different sets from each other, each of said sets having line conductive portion defining a character all parallel to one another, and the portions of each set being staggered between other sets so that a space between adjacent character forming members of one set contains a character-forming member of the other sets, a substantially transparent electrical circuit member positioned in front of said character-forming members, electrical illumination means disposed between said substantially transparent electrical circuit member and said sets of character-forming members, whereby energization of any selected set of character-forming members and said transparent circuit member will cause an illumination and display of the selected character.

11. A display device as defined in claim 10 further comprising an envelope with a transparent display surface enclosing said character-forming members, an ionizable gas contained within the envelope, electrical means for applying an ionizing potential to said transparent circuit member and one of said sets of character-forming members, and another electrical means for applying the ionizing potential and a small additional potential to any other selected set of said character-forming members to thereby shift the ionization to the selected set.

12. A display device for visual readout of any selected character at a common display area, said device comprising; a plurality of sets of character-forming plates, the plates of all sets being arranged in a single stack, each plate having a distinctive edge configuration on an edge thereof and the edge configuration of a set of plates defining a character, means for insulating each of said plates in said stack from each other, means for electrically connecting each plate in a set of plates in common, a substantially transparent electrical circuit member positioned in front of the character defining edges of the plates in the stack, an electrical illumination medium disposed between said substantially transparent electrical circuit member and the character defining edges of the plates in the stack, and means for electrically energizing any selected character set and the substantially transparent electrical circuit member to activate the illumination medium therebetween and display the selected character through the transparent circuit member.

13. A display device as defined in claim 12 wherein said means for electrically connecting each plate in a set of plates in common includes a projecting terminal lug on each plate in a set, said lugs being in alignment, and an electrical conductor connecting each aligned terminal lug.

14. A display device as defined in claim 12 wherein said means for insulating each plate in the stack of plates of the adjacent plates includes an anodized insulating coating covering the entire surface of each plate with the exception of the edge configuration defining the character.

References Cited in the file of this patent

UNITED STATES PATENTS

| | | |
|---|---|---|
| 2,632,128 | Hancock | Mar. 17, 1953 |
| 2,769,939 | Williams | Nov. 6, 1956 |
| 2,783,408 | Williams | Feb. 26, 1957 |
| 2,848,638 | Smith | Aug. 19, 1958 |
| 2,878,407 | Engleman et al. | Mar. 17, 1959 |
| 2,922,993 | Sack | Jan. 26, 1960 |